United States Patent [19]
Fichou et al.

[11] Patent Number: 5,602,830
[45] Date of Patent: Feb. 11, 1997

[54] METHOD AND AN APPARATUS FOR SHAPING THE OUTPUT TRAFFIC IN A FIXED LENGTH CELL SWITCHING NETWORK NODE

[75] Inventors: Aline Fichou, La Colle Sur Loup; Pierre-Andre Foriel, Saint Laurent du Var; Claude Galand, Cagnes Sur Mer, all of France

[73] Assignee: International Business Machines Corporation, Armonk, N.Y.

[21] Appl. No.: 526,345

[22] Filed: Sep. 11, 1995

[30] Foreign Application Priority Data

Sep. 19, 1994 [EP] European Pat. Off. ............. 94480087

[51] Int. Cl.⁶ .............................. H04J 3/14; H04L 12/56
[52] U.S. Cl. ............................................ 370/232; 370/412
[58] Field of Search .............................. 370/17, 60, 60.1, 370/84, 94.1, 94.2, 94.3; 395/200.13

[56] References Cited

U.S. PATENT DOCUMENTS

| | | | |
|---|---|---|---|
| 5,253,247 | 10/1993 | Hirose et al. | 370/94.1 |
| 5,280,475 | 1/1994 | Yanagi et al. | 370/60 |
| 5,297,140 | 3/1994 | Boyer et al. | 370/61 |
| 5,313,579 | 5/1994 | Chao | 370/60 |
| 5,390,184 | 2/1995 | Morris | 370/94.2 |
| 5,453,981 | 9/1995 | Katsube et al. | 370/60.1 |

FOREIGN PATENT DOCUMENTS 2694671  6/1992  France.

OTHER PUBLICATIONS

Proceedings of the International Switching Symposium, Yoloham, Japan, Oct. 25–30, 1992, "The Spacing Policier, An Algorithm for Efficient Peak Bit Rate Control in ATM Networks", by Eugen Wallmeier & Tom Worster.

Globecom '93 vol. 3, Dec. 1993, Houston US pp. 1844–1848 G. Marino et al "A hardware Platform for B–ISDN Services Multiplexing: design and performances of AAL and ATM layers".

Supercomm/ICC '94 May 1994, New Orleans US pp. 106–110 A Baiocchi et al "Worst Deterministic Pattern Allocation: a viable approach to attain statistical gain in ATM".

*Primary Examiner*—Hassan Kizuo
*Attorney, Agent, or Firm*—Gerald R. Woods

[57] ABSTRACT

A method and an apparatus implementing a shaping function in a fixed length cell switching network node adapter supporting output lines in a telecommunication network. The adapter includes a Time Division Multiplexing (TDM) table where each entry is a pointer to a first cell of a queue of cells stored in the adapter for a given traffic. When a new traffic is established, the TDM table is updated. A placement device performs the pre-computation of the best placement of the entries reserved for one traffic in the TDM table. The placement device minimizes the Cell Delay Variation as computed by a Generic Cell Rate Algorithm (GCRA—ITU standard organization) policer. The Cell Delay Variation (CDV) is defined as the deviation of the placement of the cells from their ideal position in an output stream, the ideal placement being when the cells are spaced with an interval corresponding to the period of traffic negotiated at traffic establishment time. The preferred embodiment includes a scheduler which reads the TDM table and fetches the corresponding cell in the queue storage to send the cell onto the output line via a line interface unit.

6 Claims, 7 Drawing Sheets

METHOD AND AN APPARATUS FOR SHAPING THE OUTPUT TRAFFIC IN A FIXED LENGTH CELL SWITCHING NETWORK NODE

RELATED APPLICATION

IBM Docket FR9-9-94-012 entitled "A Method And Apparatus For Shaping The Output Traffic In A Fixed Length Cell Switching Network Node", Ser. No. 08/530,686, filed Sep. 19, 1995, discloses look-up tables for use in scheduling in advance the departure time of cells for each transfer of traffic between a source unit and a destination unit in a fixed length cell switching network. The related application and the present invention are commonly owned by the assignee of the present invention.

FIELD OF THE INVENTION

This invention relates to telecommunication networks, particularly fixed length cells switching high speed networks. More particularly, the invention relates to traffic control using a shaping method and apparatus implemented in an ATM network node.

BACKGROUND OF THE INVENTION

The basic advantage of the new high bandwidth, low delay, fixed length cell based transfer mode techniques, such as Asynchronous Transfer Mode (ATM), is to allow multiplexing and switching of different types of information over the same network: data, voice, image, video, while optimizing the bandwidth and resources utilization.

Congestion control inside these networks is one of the major problems to be resolved. As the cells are short, no space is allocated in the header to enable error recovery for the cell payload. If one cell of the block has been lost or discarded by the network, in case of network congestion, error recovery is performed at the higher-level by recovery protocols retransmitting the user data block. The error rate being extremely low in the internode links, cells lost because of random errors is not a potential problem. However, when a node discards cells for reason of traffic congestion detected, it is unlikely that these cells will come from a small number of logical data blocks. Discarding 1000 cells, if the average user data blocks length is 2K Bytes (a low estimate), sent as 43 cells, may cause the network to absorb a retransmission of 43,000 cells! This case indeed is the worse case when the 1000 messages come from 1000 different connections. That is why the protocols need to be efficient enough to limit the congestion problems in this type of networks.

In the ATM connection-oriented networks, the end-to-end traffic of data for one user, between the source and the destination, is represented by a Virtual Connection (VC); several Virtual Connections may be grouped in a Virtual Path (VP) that can be switched as a unit. The bandwidth is allocated dynamically as part of a connection setup signalling procedure that precedes end-to-end information exchange. At call admission time, the source user provides, in addition to the destination point, a set of parameters, called the traffic descriptors, which attempt to describe the traffic that will be generated onto the links. For instance, a mandatory descriptor is the peak cell rate of the connection, R. If this parameter is sufficient to fully describe Constant Bit Rate (CBR) connections, i.e., periodic stream of cells such as uncompressed voice, further parameters are necessary to describe Variable Bit Rate (VBR) connections such as those for video traffic. The burst of traffic is measured by the average cell rate and the average duration of an emission at the peak rate R in most of the high speed networks literature. As seen above, in ATM networks, cells may be lost or unacceptable delays can be induced in case of traffic congestion. Depending on the type of traffic conveyed over the ATM network, the first or the second just mentioned behavior of the network, in case of congestion, may damage the quality of traffic over the virtual connections: for voice traffic, cells can be lost but a delay in transmission is unacceptable. When data is transferred on the virtual connection, the delay can be acceptable but not the cell loss. That's why the network guarantees a Quality of Service (Qos). The QoS guaranteed by a network is, in most cases, expressed in terms of cell loss probability and maximum end-to-end delay for a cell, independently of network topologies and protocols. One can note that the end-to-end delay between two users is increased if the end-to-end connection crosses different network entities (private or public carrier networks) which have their own protocols and traffic management.

In order to meet the Qos, the network nodes have to control the traffic congestion both at connection admission time and once the connection is established.

At connection admission time the access node has to decide if it can accept the connection or not: its decision is based on the actual load of the links, and its analyzing of the traffic parameters of the connection. Moreover, it has also to compute a path table to carry this overload of traffic through the different nodes. If no path is found, the call is rejected. It is important to note that the decision to accept a new call has to be taken not only if the network node estimates that the QoS for the connection will be met, but also if it is sure that the added traffic will not have a significant impact on the QoS of all the connections already established.

A first control on traffic congestion, once the connection is established, is performed by the policing function implemented in a device, the policer, of the network access node adapter. The policer will detect and penalize the violation of the peak cell rate on the current traffic compared to the one required at call set up. Instead of the peak cell rate, another descriptor such as the Sustainable Cell Rate, the SCR (that is not yet a standardized parameter) can be used as a criterium for the policing function. In the following description, any reference to the peak cell rate can be replaced by SCR. The policing function is also referred in the ATM literature as the Network Parameter Control (NPC) or the Usage Parameter Control (UPC) depending if the source unit is a Network Node or a Customer Premise Node. Indeed, an efficient policing function should be transparent as long as the traffic characteristics provided by the source at call setup are met. This means that the policing algorithm should discard or tag user cells, unless the cell loss probability is less than or equal to the one defined by the QoS. On the other hand, the policing function will also discard or tag the cells that are in excess versus the peak cell rate provided at call set up.

A second control on traffic congestion consists in shaping the output network node traffic by spacing the cells departures in such a way that the time between two departures of cells for a same connection is never below a minimal value negotiated at connection setup time. It has been shown that, on the average, the multiplexing of spaced cells tends to decrease the 'burstiness' of the aggregate traffic and that allows a better utilization of the network resources.

FIG. 1 shows a shaping principle applied to an input cell stream 1. The shaded cells have been sent by a first user and the cells marked with a cross have been sent by a second user. The result of shaping is shown with an output cell stream 2: the cells marked below with an equals sign (=) have been moved and the departure time between two cells have become more regular. The spacing of the cells is done in respect with the bandwidth share required by the users. In the output cell stream, the departure time between two cells is smaller for the cells of the first user than for the second user because the first user has required a greater bandwidth share than the second user. Moreover, in the output stream, the bursts of traffic have decreased. One can note that the groups of two cells belonging to a same connection of the input stream 1 have disappeared in the output stream 2.

The policing function is implemented in the access network nodes. A device implementing the policing function, the policer, is part of the high speed adapter cards; it controls and, if necessary, penalizes the traffic entering the network.

The shaping function is implemented in the devices accessing a network: they can be Customer Premise Nodes accessing an ATM network or a Network Node at the boundary of a first ATM network and intending to access another ATM network. As some Customer Premise Nodes can implement a policer, it is recommended the shaping function be also implemented in the node at the boundary of a network connecting Customer Premise Nodes with policers. The device implementing the shaping function, the shaper, is also part of the high speed adapter cards and controls the sending of the output traffic cells.

FIG. 2 shows a shaper and a policer implemented in a network node. Input lines 15 convey input cell streams (not shown) which are received by input adapters 10. In each adapter 10 the policer controls and penalizes, if necessary, the cells stream for each user. Afterwhich, the cells are switched in a switch 30 and sent to output adapters 20. In each output adapter 20, there is a shaper which spaces and sends the cells to output lines 25.

FIG. 3 shows a network topology to convey the traffic of users coupled to a source unit 40 to a destination unit 60, through two networks 42 and 52. In these networks, the nodes 45 are the access nodes; the policers are implemented in these access nodes 45. The shapers are implemented in the source unit 40 and in the node 50 which is at the boundary of the first network 42 and which accesses the second network 52. As the destination unit 60 may be a Customer Premise Node having implemented a policer, it is recommended a shaper also be implemented in the node 55 located at the boundary of the network 52.

Many policing schemes have recently been studied; some of the most known are the leaky bucket; the jumping window; the moving window, as described by Raif O. Onvural in his book entitled "Asynchronous Transfer Mode Networks: Performance Issues", Artech House, Boston (1994). Without lack of generality, each policing function estimates one or more traffic parameters for a given period of time P. As this period of time P decreases, the policer may become non-transparent to users generating a traffic in conformance with the parameters negotiated at connection establishment time. On the other hand, as P increases, the policer takes longer to detect that the source exceeds its declared characteristics. However, the latter approach is more fair since it allows the user to generate a stream of cells that have short-term fluctuations. This is done at the expense of more memory requirements at the node level.

The only policing function proposed as a standard by the ITU (International Telecommunications Union), is the Generic Cell Rate Algorithm (GCRA). Details of the GCRA are given in the ATM Forum, "ATM User-Network Interface Specification" Version 3.0, 1994. The GCRA role is, for each connection, to monitor the traffic arriving upstream according to the cell period T (T corresponds to the inverse of the peak cell rate R) and a given tolerance $\tau$ on this period. Basically, a cell is assumed to be conforming if the time elapsed between the arrival of two consecutive cells (belonging to the same connection) is greater than or equal to T−$\tau$. If not, the cell is assumed to be non-conforming and is tagged and then, possibly discarded.

The policer discards cells not only because the source of traffic has violated the parameters negotiated at connection establishment, but also because of a distortion in the cell stream, well known as "jitter" or Cell Delay Variation (CDV). This distortion is due to the queuing of the cells at each intermediate network node and more generally the multiplexing of the cells on the output lines. The magnitude of the "jitter" depends on many parameters: the connection peak rate; the peak rate of the other connections that share the same link; the link load; the number of nodes passed through, etc. A consequence of the "jitter" is to induce, as the user cells travel through the network, some distortion on the traffic parameters declared by the source upstream. Especially, the instantaneous peak cell rate R' may be modified and may pass beyond the value R declared by the source upstream at connection establishment time. In the worst case R'>R and the policing function with a short measurement interval (small period of time P) may take undesirable discarding actions. This is typically the case of the GCRA when the specified tolerance $\tau$, named Cell Delay Variation Tolerance (CDVT), is small. That is why the shaping function will buffer cells so that the departure rate from a node is less that the arrival rate. It has been shown that the multiplexing of spaced cells tends to decrease the "burstiness" of the aggregate traffic and that allows a better utilization of the network resources.

Policing and shaping control techniques should take into account the real-time constraints, as implemented in high speed network node adapters dealing with lines at several hundreds of Megabits per second. For example, the cell transmission time (cell time cycle) is about 2.7 µs for a line speed of 155.52 Mbps (OC-3), and less than 0.7 µs for a line speed of 622.08 Mbps (OC-12). This implies that the shaping and policing methods have a very short time to 'manage' an incoming call. For instance, assuming (1) that only ten instructions are needed to both compute a cell transmission time and queue the cell to an output buffer and (2) each instruction takes no more than one time cycle, the execution requires more than 14 Mips (Million of instructions per second) from a processor devoted to this task, for an OC-12 output link. Usually hardware devices are needed and only simple computations (a few software instructions) and basic manipulations of cells are possible. As a consequence, shaping function will have to cope with a trade-off between complexity and performance.

Taking into account these above performance considerations, two shaping schemes are briefly examined hereunder. They represent the state of the art as understood by the inventors.

The first scheme relies on a very basic principle: the shaping function sends a given number, p, of cells at a link speed C, and keeps "silent" (i.e. the cells are buffered) until $$p\left(\frac{C}{R} - 1\right).$$

If this approach requires no computation nor complex operations at the cell level, the CDV induced is quite bad and the tolerance that should be accommodated at the GRCA level to accept all the cells would be typically $$p\left(\frac{C}{R} - 1\right).$$

The second one, more sophisticated, is detailed in Eugene Wallmeier and Tom Worster article entitled "The Spacing Policer, An Algorithm For Efficient Peak Bit Rate Control in ATM Networks", published in the Proceedings of the of the XIV International Switching Symposium, Yokohama, Japan, Oct. 25–30, 1992. For an incoming cell of one connection, the time between two cell transmissions is such that the output peak rate is met, and the cell is queued to a list-of-cells that have to be sent at the same time tk. This list is referenced by the nth entry of a cyclic calendar with N inputs. A new entry of the calendar is sought at each cell time cycle, and the list-of-cells that have to be sent at time tn ($0 \leq n < N$) if any, is moved and queued to an output list. In short, the following operations are done at each cell time cycle:

Computing the transmission time ti for the incoming cell belonging to connection i;

Enqueueing the cell to the list-of-cells at the nth ($0 \leq n < N$) entry of the calendar;

Moving the list-of-cells of the current position m ($0 \leq m < N$) of the calendar to the output list;

Sending the first cell to the output list;

Incrementing the calendar position;

As one can see from above, the number of computations/manipulations is important. Moreover, the size of the calendar has to be quite large to support connections with small peak rate (large T). Although this algorithm gives good results in terms of CDV, it is impossible (without the knowledge of the aggregate incoming traffic pattern) to predict the "jitter" induced by the spacer. Therefore, the tolerance that should be accommodated at the GRCA must be quite large to ensure a minimal cell loss probability.

The state of the art described above and all known existing shaping schemes rely on the same principle. They compute a cell transmission time at each cell arrival, which depends on both current time and the time when the last cell was transmitted. For this reason, these shaping schemes may be referred as cell-basis schemes.

There is a need in the art to provide in fixed cell length network nodes adapters an efficient shaping method which controls and minimizes the CDV with a minimum of computing resources. This would limit the bursts of traffic and thus the problem of traffic congestion in these high speed networks. This would also optimize the bandwidth negotiated with the access node of a network. Particularly, when applied to ATM networks having implemented the GCRA algorithm in its access nodes, there is a further need to compute a value of the CDV tolerance which is the most accurate and never passed for the traffic considered thereby avoiding any penalization of the policer.

SUMMARY OF THE INVENTION

An object of the invention is a method and apparatus for shaping the output traffic in a fixed length cell switching network node using a table to relate positions of cells in an output cell stream.

Another object is a method and apparatus for computing in advance the 'best' placement for cells of a new connection in an output cell stream from a network node.

Another object is a method and apparatus for computing and minimizing the cell delay variation among cells in an output cell stream from an ATM network node.

Another object is a high speed adapter optimizing the best placement of cells in an output cell stream using computation methods taking into account the cell delay variation among such cells.

Another object is a method and apparatus for avoiding cell collisions among cells in a plurality of output cell streams from a switching node in a telecommunications network.

Another object is a method and apparatus for providing output cell streams from a switching node in a telecommunications network where the output cells have the best placement for minimum cell delay variation and no cell collisions occur among the output cell streams.

These and other objects, features and advantages are achieved in the present invention using a shaping method and apparatus implemented in a communication network transporting fixed-length information cells through communications nodes supporting the cells stream traffic sent by the users from one source unit to one destination unit.

In a preferred embodiment of the invention these fixed-length cells communications nodes are ATM network nodes supporting user connections from one source unit to one destination unit.

In one form, the invention is implemented in each network node adapter supporting output lines, a shaping method to compute in advance, each time a new connection is established, the placement of the cells of said connection inside the stream of cells corresponding to the already established connections and which will be sent onto the output lines.

Assuming that a descriptor, R, quantifying the traffic rate has been sent in the connection establishment messages by the source unit, and that a memory stores queues of cells, one for each transfer of traffic, the method provides a Time Division Multiplexing (TDM) table of N entries, each entry representing the position of one cell in the output cell stream which will be sent onto one output line of the network node. The method consists in updating and reading the TDM table as follows:

1—at each new traffic accepted by the network node, the number S of positions to be reserved for said traffic in the TDM table and the period T of said traffic are computed using the descriptor R and the size of the table; T is the period corresponding to the ideal traffic flow required for the traffic;

2—A possible placement in the TDM table of the S entries corresponding to said traffic is characterized by the first entry, n, reserved among N entries. The Cell Delay Variation (CDV) for a placement is the deviation of the placement of the cells in the output stream from their ideal position which is when the entries are spaced with an interval of T. For each placement, the CDV is computed; the placement corresponding to the smallest CDV is stored;

3—The entries of the TDM table corresponding to the placement stored are filled up with a pointer pointing to the first cell of the queue of cells stacked in the memory for said traffic;

4—The TDM table is read continuously and for each entry filled up, the 'first in' cell from said queue is dequeued and sent onto the output line; once the last entry in the TDM table is read, the reading operation restarts from the first one.

As this placement of the cells of the output stream is prepared at each new connection establishment, the number of operations required for each cell cycle is minimized.

The different embodiments of the invention will correspond to different levels of accuracy for the computation of the 'best' placement for the cells of a new connection in the output cells stream.

Particularly, according to an additional feature of the invention, the shaping method can include, in the computation of the cells placement, a step of computation of the Cell Delay Variation tolerance; optimizing its evaluation over the other existing methods.

In summary, the shaping method of the invention:

minimizes the manipulations at each cell cycle as the placement of the cells in the output stream is pre-computed at the connection establishment.

minimizes the Cell Delay Variation generated by the multiplexing and queuing of all the connections.

In consequence, the invention implemented in ATM network nodes, allows the expected current ATM performance up to 100 number of new connection establishments supported per second with line speeds of up to OC-24:1.2 Gbps.

DETAILED DESCRIPTION OF THE PREFERRED EMBODIMENT

The preferred embodiment of the invention is a shaping method implemented in a shaping apparatus, or shaper, located in the transmit part of a fixed-length cell switching network node adapter supporting output lines.

The invention incorporates a Time Division Multiplexing (TDM) table with N entries. Each entry corresponds to the slot assigned to one cell of the stream of cells which will be sent onto the output line. For each new connection established, the shaper computes in advance the placement of the corresponding cells among the output stream cells; the number of entries N is a compromise between the accuracy of the placement and the storing resources capacity of the adapter. Each entry may be free or assigned to one of the pre-established connections (VCs or VPs). An entry already assigned for one cell of connection i contains a pointer i (an index or address etc...) pointing to first cell of connection i to be sent onto the output line.

Figure 1:
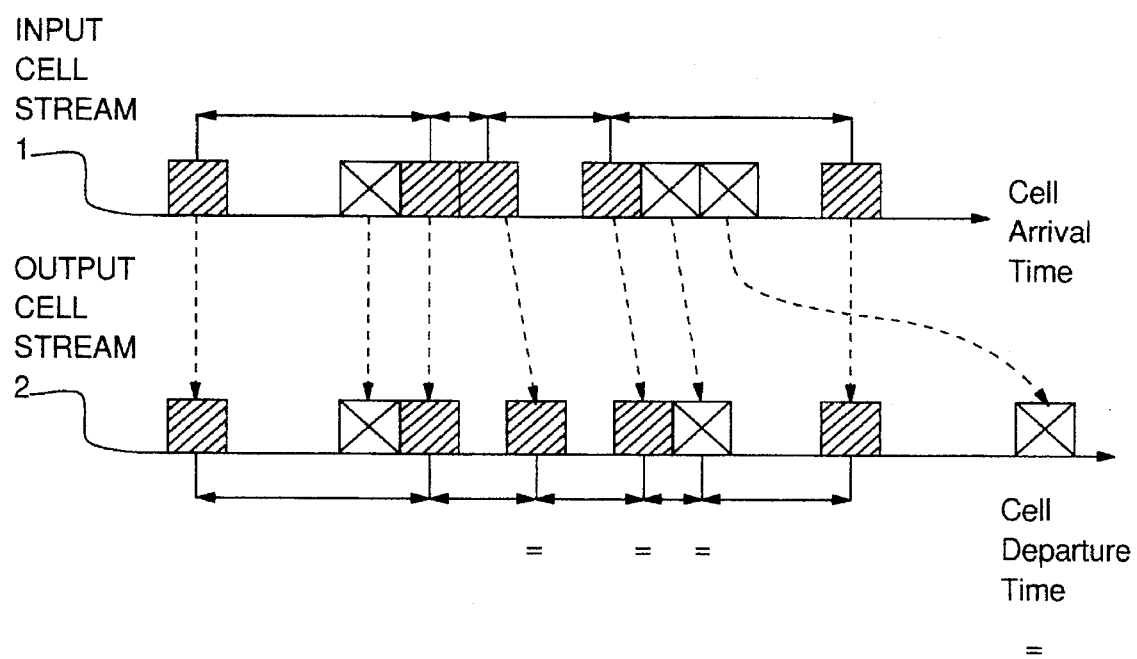
FIG. 1 illustrates a shaping principle applied to an input cell stream in forming an output cell stream.
Figure 2:
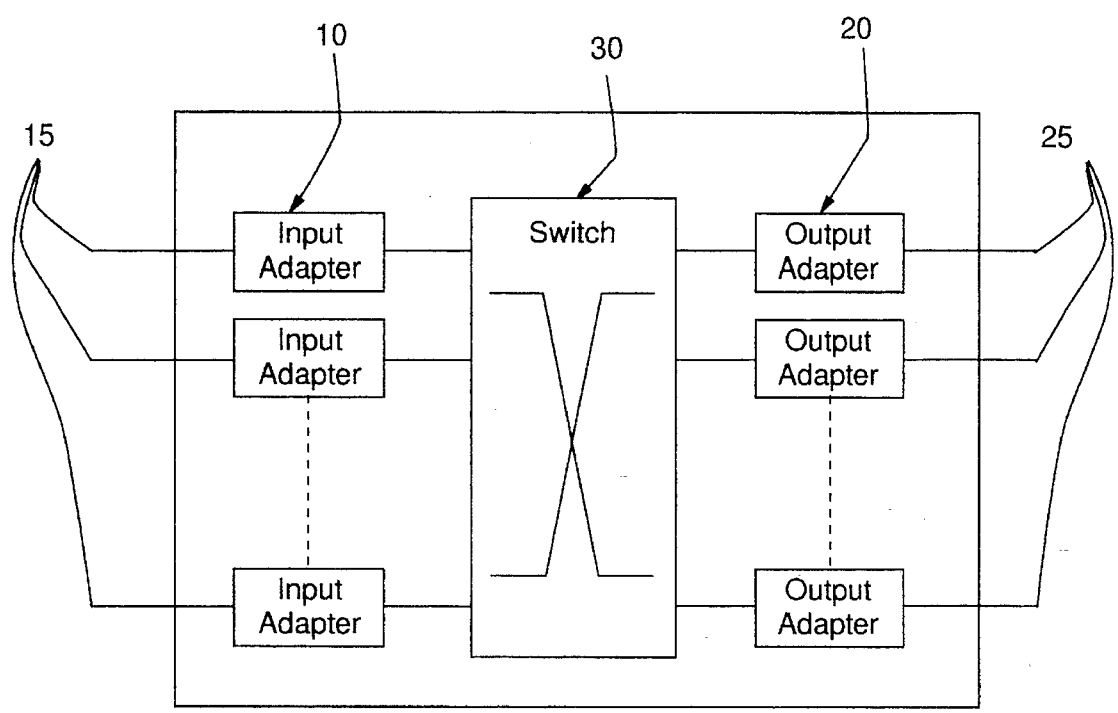
FIG. 2 is a block diagram of a policer and shaper in an ATM network node adapter.
Figure 3:
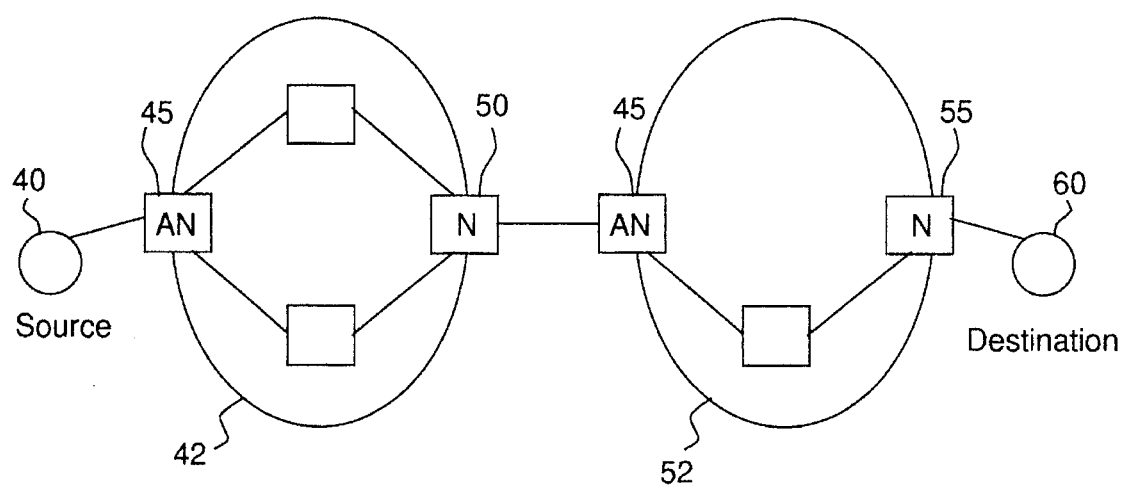
FIG. 3 is a block diagram of a shaper and a policer placed at the boundaries of ATM networks.
Figure 4:
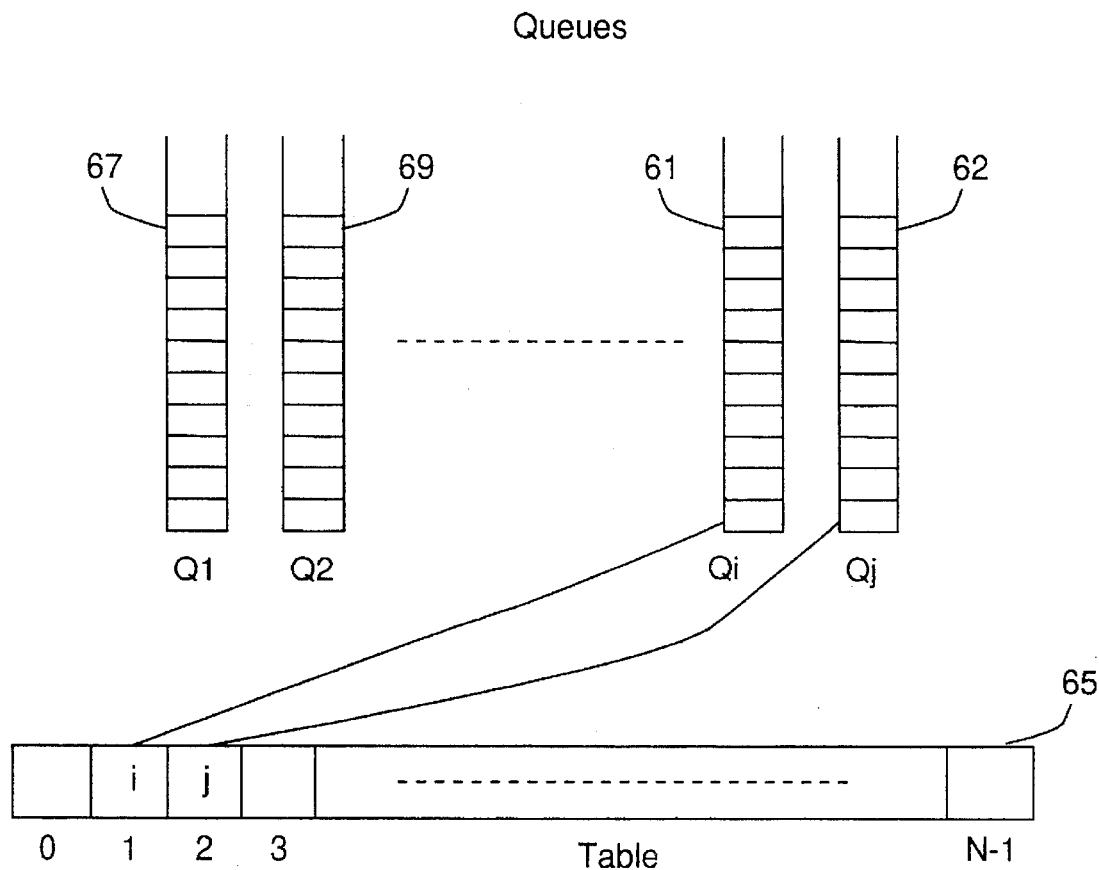
FIG. 4 is a representation of queuing mechanism incorporating the principles of the present invention in an output adapter.

In FIG. 4, a TDM table 65 has N entries; when connections 0, 1, i, j (etc...) are established, the incoming cells from connection 0, 1, i, j (etc...) are queued in the storage areas 67, 69, 61, 62 corresponding to the queues Q0, Q1, Qi, Qj containing the "first in first out" stack of cells received in the input cell stream of the corresponding connections. In the TDM table 65, some entries are free (0, 3, N-1 etc..), others contain a pointer i and j (in entries 1 and 2) pointing to the "first in" cell of respectively Qi and Qj queues.

Figure 7:
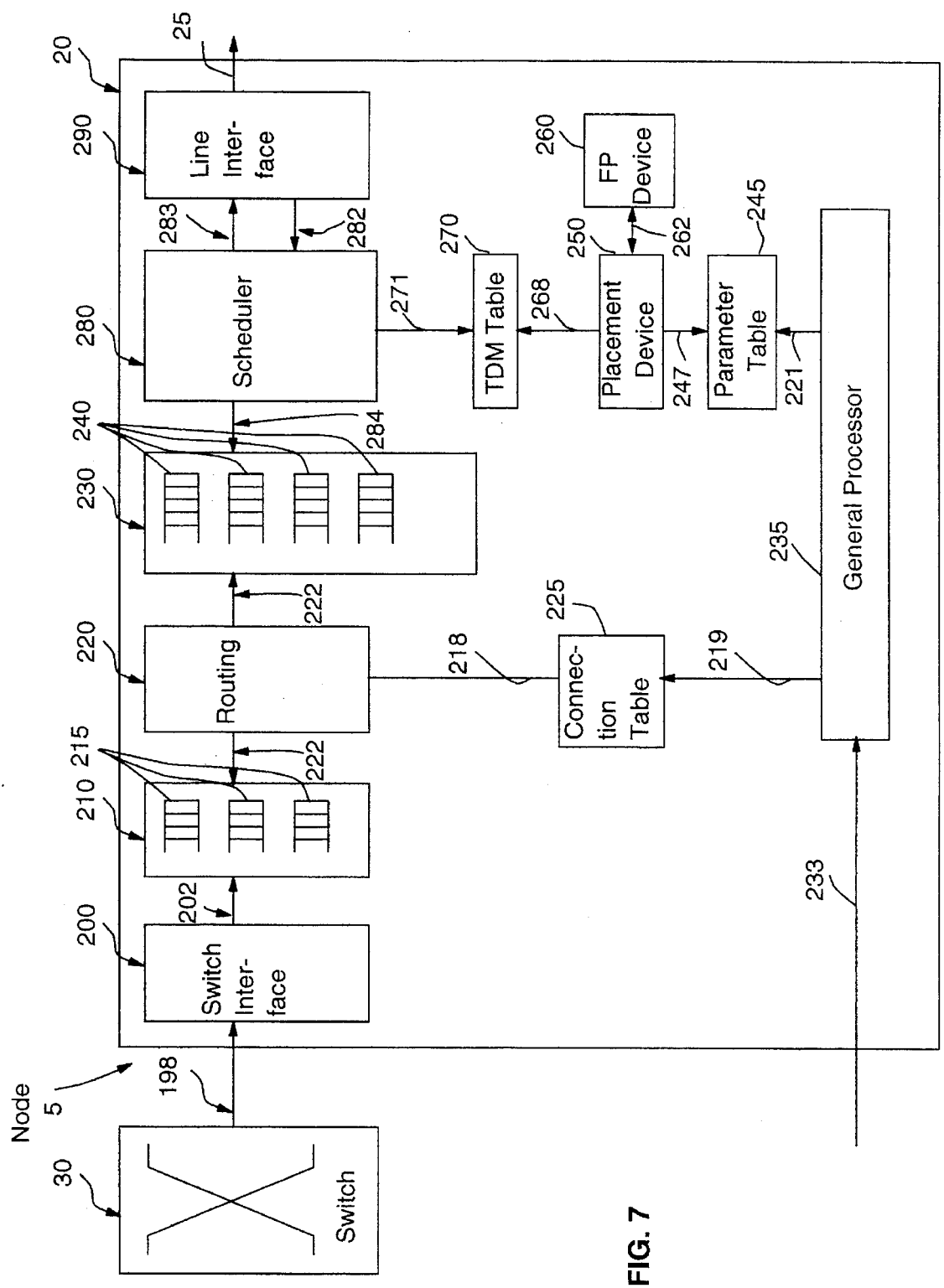
FIG. 7 is a block diagram of apparatus implementing the shaping function of the present invention.

In the adapter 20 shown in FIG. 7, a scheduler 280 will read continuously a TDM table 270 and when, for instance, one entry references the Queue Qi, the first cell of the Queue Qi, if any, is simply dequeued and transmitted onto an output line 25. When the last entry is read (N-1), the next entry read is the first entry of the table (0), the table having a cycle of N.

The TDM table is updated at each new connection establishment. When a new connection i has been accepted by a general processor 235 of the node, its peak rate descriptor, Ri is provided to a placement device or shaper 250. The shaper allocates a queue Qi, evaluates the theoretical period Ti (three possible methods which will be seen as different embodiments) and computes the number of entries Si in the TDM table to be assigned to the cells of the connection with a method described later.. Then, the shaper reserves in the TDM table the Si entries of connection i into an array of N, in such a way that the distance between two consecutive reserved positions minimizes the Cell Delay Variation (CDV) on the period Ti. The idealistic positions in the TDM for the connection i is when all the spaces between two entries reserved in the TDM are equal to the theoretical period Ti. In the most of cases, some entries corresponding to the theoretical placement are already reserved for another connection and in the preferred embodiment the nearest free entries will be reserved in such a way that the CDV tolerance $\tau$ as defined by the GCRA algorithm will be minimal.

To compute the best placement for a connection i, the shaper will test all the possible placements of the Si entries in the TDM table, one placement being characterized by the position of the first entry, the reference position. The objective is to space the other ones with an interval equal to the period, but if the slot is not free, there is a 'collision' with an entry already reserved for another connection and the cell will be moved in the nearest free slot (this change inducing a CDV). The best reference position $n0^*$ ($0 \leq n0^* < N$) is selected in the following way:

The maximal value of the CDV tolerance (as seen by the GCRA module) induced, $w(n0^*)$, for the Si positions of connection i is the minimal. The formula expressing $w(n0^*)$ is presented later in this description.

If for two values of n, the $w(n)$ have the same value, $n0^*$ will be the n value for which the number of collisions between the ideal positions and the ones already reserved for another connection, $y(n0^*)$ is the minimal one.

Once the best reference position and the corresponding placement for the other entries have been computed, the Si entries of the TDM table are then updated with the pointer i to the first cell to be sent in the queue Qi of connection i.

Figure 5:
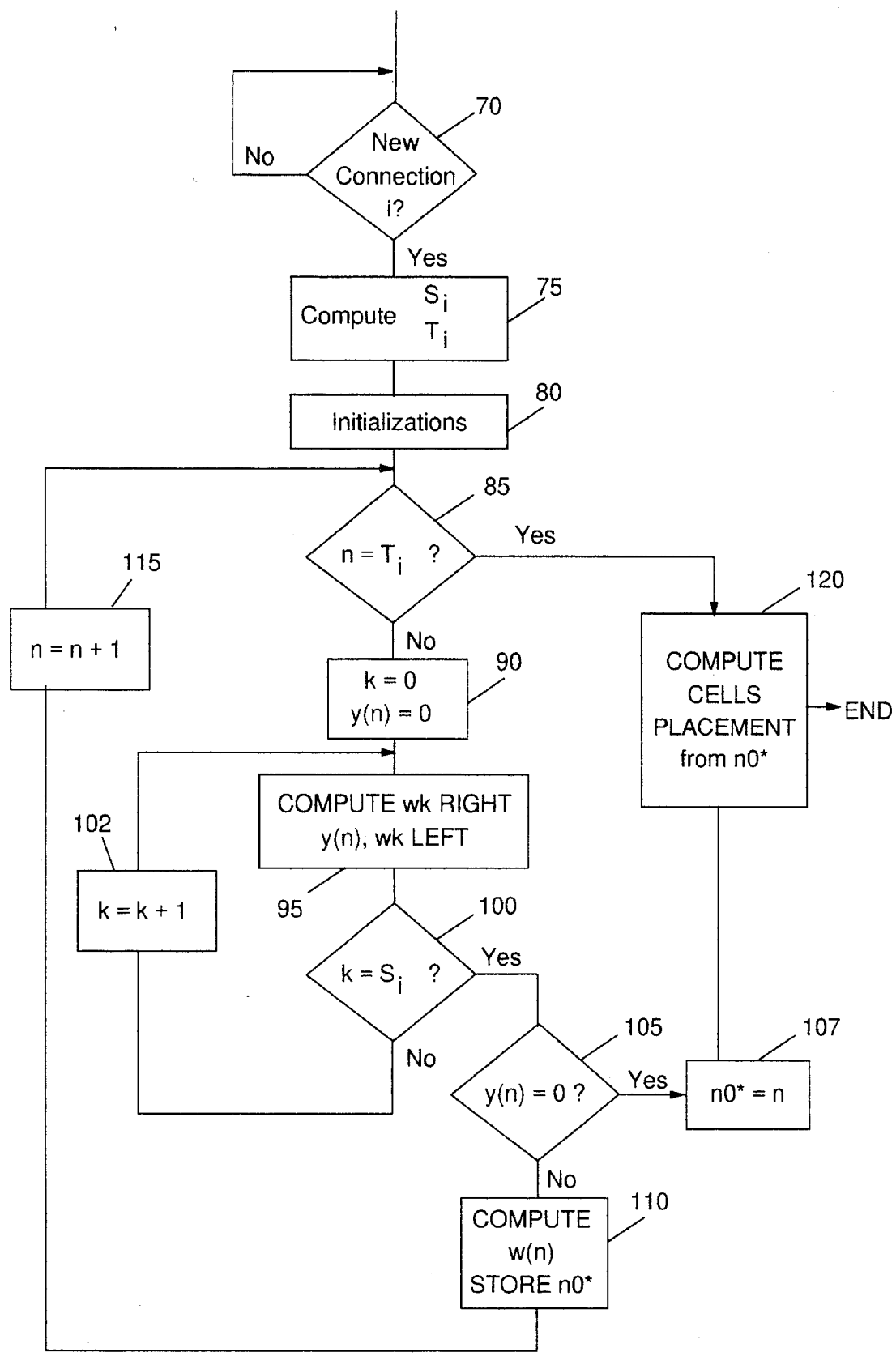
FIG. 5 is a flow diagram of a method for research of the best reference position for a new connection i.

FIG. 5 represents the method for determining the best reference position for the Si cells in the TDM table. As stated before, the reference position characterizes the placement of the cells; it is the position of the first entry for connection i; it will be placed first in the TDM table, the other positions will be deduced from the first one. For a reason of simplification, in the description of the method, all the possible reference positions n in the TDM table will be tested, from n=0. In fact,, the first position to be tested will be one position obtained at random in the TDM table. The other reference position tested will be the first incremented by 1.

As described hereinafter, the computation of the placement of slots is only based on the peak rate descriptor of the incoming ATM connections. In the preferred embodiment, the two criteria for the choice of the best position are: (1) the position for which the CDV tolerance calculated by the shaping function is minimal and for identical values of the CDV tolerance, and (2) the position for which number of collisions in the TDM table with the slots already assigned to cells of established connections is minimal. Returning to FIG. 5, the method is activated when a call setup arrives on the input line for a new connection i: step 70. The step 75 is for the computation of the period Ti and the number of slots, Si, between 1 to N, which will be occupied in the TDM table by the pointers to the cells of the connection i. Assuming Ri is the peak rate provided by the call setup parameters and C, the output line speed:

$$Si = \lceil Ri/C \cdot N \rceil, \; Ti = N/Si$$

$\lceil X \rceil$ denotes the nearest integer greater than or equal to X.

In fact, the above formulae can lead to an over-allocation of bandwidth to connection i. Three alternate solutions for other embodiments will be described hereinafter. Step 80 is for initialization of the counter n representing a reference position in the TDM table characterizing one placement of the sequence of Si cells to be inserted in the TDM table. At initialization, n=n0* =0; w(n0*), which will represent the minimum CDV calculated for all the possible placement, is set to a maximum value, N. Step 85 is a test to stop the loop if all the tested reference positions in the TDM table (n, 0≦n<N) have been considered. In test 85 the limit for n is Ti and not N for a reason of simplification justified later in the description.

For a reason of simplification, the possible reference positions n which will be tested, start from n=0. In fact, the first to be tested will not be 0 but an integer obtained at random between 0 and N. Another simplification explained later allows to limit the number of reference positions tested to Ti (or $\lceil Ti \rceil$ if the result of the computation for Ti is not an integer) instead of N.

If the result of the test 85 is yes, the last operation, step 120 will consist in assigning the Si slots in the TDM table starting from the reference position n0*. This is done by updating the corresponding entries of the TDM table by the integer referencing the queue Qi. If the result of the test 85 is no, Step 90 is the initialization of position k in the TDM table and y(n), the number of collisions detected for the placement characterized with the reference position, n. Step 90 is executed when all the possible reference positions in the TDM table have not yet been considered. Step 95 is for updating for the entry k, the number of collision, y(n) and the cells shifts (advance and delay) respectively wk Left and wk Right. The number of collisions y(n) is incremented if a collision is encountered; wk Left being the advance induced by the moving from the ideal position of the entry number k to the nearest free entry; wk Right being the delay induced by the moving from the ideal position of the entry number k to the nearest free entry (see expressions 1, 2 and following ones later). Step 100 is a test to detect when all the slots Si for connection i have been considered. If not, the next slot is analyzed, k is incremented in step 102 and, step 95 is reperformed. The loop is repeated until all the Si slots have been considered. When the last slot of the Si slots for connection i has been considered, and if for the Si slots there is no collision (test 105, y(n)=0?), this placement is the best one. The CDV is equal to zero and n is stored as the best reference position, n0* (step 107). The last operation 120 will consist in assigning the Si slots in the TDM table starting from the reference position n0*. This is done by updating the corresponding entries of the TDM table by the integer referencing the queue Qi. If the result of test 105 is no, there is at least one collision in the placement analyzed. The CDV w(n) induced is calculated and will be the sum of the maximal delay (Max (wk Right)) and the maximal advance (Max(wk Left)) among all the wk Right and wk Left calculated for the given n (see expressions 1, 2, 3 later). If w(n0,) is the minimum value for all the n already considered, the corresponding n0* will be stored (step 110) as the best reference position:

w(n0*)=Min(w(j))

j=0 . . . n

Optionally, in a different embodiment of the invention, for each placement computed and analyzed, the current best placement can be stored which would avoid the later re-computation for the best placement in step 120. The choice of storing would depend on the memory capacity in the adapter. This placement storing requires Si entries for connection i. Then, n is incremented in step 115 and the loop is stopped by test (85) if all the possible placements of the Si cells for connection i have been analyzed. Thus, if the result of test 85 is n=Ti, the last n0, calculated is the best one and will be taken as the best reference position. The last operation 120 consists in assigning the Si slots in the TDM table starting from the reference position n0*. The assignment is done by updating the corresponding entries of the TDM table by a pointer pointing to the queue Qi.

Other factors in selecting the best reference position include the following:

1) The calculation of the number of collisions y(n), for a given reference position n and used for the determination of the best reference position, is expressed as follows:

The TDM table may be seen as a binary sequence x(n) (0≦n≦N), with the following convention:

x(n)=1 if the entry is already assigned to another connection.

x(n)=0 if the entry is not assigned to another connection.

In the same way, a binary sequence, si(n) (0<n<N), of the positions of the cells of connection i ideally spaced in a time window of length N, according to the peak rate Ri:

$$si(n) = 1 \quad \text{if } n = [kTi](1k = 0, \ldots Si - 1)$$
$$= 0 \quad \text{otherwise}$$

[X] denotes the integer the nearest to X.

The number of collisions between entries already assigned to other connections and the Si positions equally spaced of the ideal representation si (n) of the incoming connection i can be represented as a pseudo 'correlation' y(n) which is a pseudo correlation between the si(n) and the x(n):

$$y(n) = \Sigma x(n+k \; [N]) si(n+k \; [N]) \; n=0, \ldots, N$$

k=0 to n−1

Where A+B [N] denotes the sum of A and B modulo N. As si(n) =0 for all n not equal to [kTi] (k=0, . . . Si−1), y(n) may be written as:

$$y(n) = \Sigma x(n+[kTi][N]) \; n=0, \ldots, N$$

k=0 to N−1

2) The CDV tolerance w(n) induced by the placement of the Si cells with the reference position n and used for the determination of the best reference position is computed as follows:

If n is the reference position for the placement of the Si cells the other theoretical positions of the cells will be n(k)=n+[kTi][N], k=0, . . . , Si−1

If w Left max is the maximal advance, for the reference position n, of the entries in the final placement compared to their theoretical positions n(k) (k=0, ... Si−1); wk Left being the advance induced by the moving from the position n(k) to the nearest free entry.

If w Right max is the maximal delay, for the reference position n, of the entries in the final placement compared to their theoretical positions n(k) (k=0, ... Si−1); wk Right being the delay induced by the moving from the position n(k) to the nearest free entry (the integers u and v being the number of entries of the moving).

$$wk\ Right = \Sigma_u \times (n(k) + u[N])  \quad \text{(expression 1)}$$

$$wk\ Left = \Sigma_v \times (n + n(k) - v[N]) \quad \text{(expression 2)}$$

Expression 1 and expression 2 are computed until the two first non-assigned slots are found. Clearly, wk Right=wk Left=0 if x(n(k))=0. Then, w Left max and w Right max are updated when necessary as follows:

w Left max=max {wk Left } if wk Right>wk Left>0

(k=0, ... Si−1)

w Right max=max {wk Right} if wk Left≧wk Right>0

(k=0, ... Si−1)

Then w(n) is obtained applying:

$$w(n) = w\ Right\ max + w\ Left\ max \quad \text{(expression 3)}$$

3) In the case where there are found more than one reference position for which the placement of the Si entries in the TDM table generate the same minimal value w(n) of the CDV tolerance, the second criterium for the choice of the reference position will be the smallest number of collisions as described below:

If we denote by W the set of positions nj j=0, ... such that $$W=\{nj;\ j=0,\ldots / w(nj) = min\{w(n)\}\}$$

n=0, ... N−1

The elements belonging to the set W are the initial positions nj for which the computed w(nj) is minimal. The position n0, is defined as one element of the set W and such as:

$$y(n0^*) = min\{y(nj)\} \quad \text{(expression 4)}$$

Figure 6:
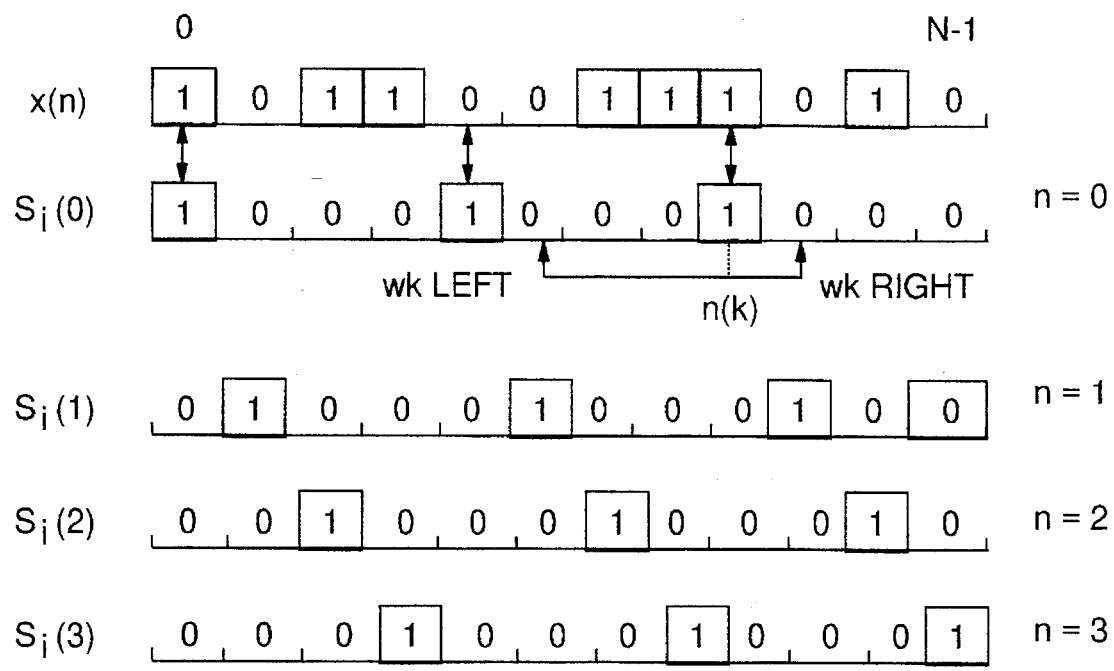
FIG. 6 is a representation of a cell placement method incorporating the principles of the present invention.

In FIG. 6, five representations of the TDM table illustrate the various steps for computing the best placement of the Si entries in the TDM table corresponding to the Si cells of connection i. The term x(n(k)) is the binary sequence representing the TDM table entries occupied by the already established connections. The entries containing 1 are reserved for one connection. The entries containing 0 are free and could be used if a new connection was established. The second line Si(0) is the binary sequence representing the TDM table entries occupied by the ideal placement for a new connection i if the entry n=0 is chosen as the reference position. The space of 3 entries between two entries corresponds to the period computed by the shaper for connection i. The three double arrows between x(n) and Si(0) indicate the three collisions between the entries of the ideal position and the entries already occupied by the existing connections. As an example of the computation performed by the shaper, when testing the reference position n=0, the shaper moves the third entry to the nearest free entry to left (wk Left=3) or to Right (wk Right=1) from the ideal position n(k). The placement corresponding to the reference position n=1 has no collision. Following the method, this position will be stored as the reference position. In this case, the shaper stops the computation. The two other lines representing respectively the binary sequence for the reference positions n=2 and n=3 have been indicated in FIG. 6 just to illustrate the different options for the placement computation.

This completes the formal description of the preferred embodiment of the invention.

One simplification used in the solution of the preferred embodiment consists in limiting to the period Ti the number of possible reference positions tested which limits from N to Ti the number of computations performed for y(n) and w(n). Indeed, there is some redundancy in the results obtained for y(n) and w(n) when n=kTi k=0, ... ,Si−1. For example, let suppose in a first time that Ti=⌊N/Si⌋=N/Si, i.e., N may be divided by Si. Giving an arbitrary position m in the TDM table (0≦m≦N), it can be easily shown that:

$$Y(m) = y(m + Ti[N]) = \ldots = y(m + (Si - 1)Ti[N])$$

$$y(m + 1[N]) = y(m + 1 + Ti[N]) = \ldots =$$

$$y(m + 1 + (Si - 1)Ti[N])$$

.
.
.

$$y(m + (Ti - 1)[N]) = y(m + (Ti - 1) + Ti[N]) = \ldots =$$

$$y(m + (Ti - 1) + (Si - 1)Ti[N])$$

The same remark holds for w(n). Therefore, only the first Ti terms y(m), y(m+1) , ... ,y(m+(Ti−1)[N]) and w(m) ,w(m+1[N]), ... , w(m+(Ti−1)[N]) need to be computed.

On the other hand, if Ti=⌊N/Si⌋<N/Si, all the terms y(n)(0≦n≦N) are not computed. But, the "local search" of an entry free, given by the term wk, allows to approximate the full computation. Such simplification brings up the following remark: the number of terms {y(n),w(n)} computed is constant and equal to Si. Further, Ti=N (instead of $N^2$ if the first definition given for y(n) applies). In consequence, there are less computations of {y(n),w(n)} as Ti is small. This is coherent, since the more Si, the less probability to have w(n)=y(n)=0, whatever the position n. Simulations have shown that the degradation of performance is negligible, while computation time is strongly enhanced. More generally any integer between 2 and N can be taken as the number of placements to be analyzed. In the preferred embodiment the number being Ti is the best compromise. This simplification is available for any kind of fixed length cell switching network.

In another embodiment, only one criterium can be used to compute the best reference position for the placement of the Si cells of connection i. The best reference position could be the one with the lowest number of collisions as provided in expression 4. This solution is simpler but less optimized than the solution including the second criterium, the CDV, as provided by expression 3 and chosen for the preferred embodiment.

Another embodiment of the solution consists in stopping the computation to determine the best reference position when w is greater than w min already found. The following additional test can be added: if the CDV computed is larger than the minimum CDV found for a previous position, stop the current position computation.

Three embodiments of the invention are related to the evaluation, for the connection, of the number of cells Si to be placed in the TDM table, the period Ti and more specifically [kTi].

In a first embodiment, $Si=\lceil Ri/C.N \rceil$; this evaluation leads to an over-allocation of bandwidth for connection i. The problem to determine an accurate value for Si comes from the granularity characterizing a finite time table. However, the values assumed limit to 1% the error on Si for connections with $Ri \geq \_1$ Mbps. The computation of Ti and [kTi] requires floating point operations. This may be easily achieved by a hardware device dedicated to this purpose for computing Ti and providing, for each k the appropriate position [kTi]. This embodiment allows to have a traffic pattern that matches as close as possible the theoretical one (on a non slotted time axis). As a consequence and assuming that no CDV is induced by the placement method (which is the case, for instance for the first connection established), the tolerance is limited by one slot (=2.7 µs for lines speed of 155.52 Mbps). The value of the CDV tolerance which will be provided to the policer of the access node will be w(n0,)+1.

A second embodiment of Si and Ti less optimal than the first one does not use a floating point computation. Assuming that Si is estimated as in the first embodiment as $Si=\lceil Ri/C.N \rceil$, and Ti is considered as an integer:

$$Ti=\lfloor N/Si \rfloor$$

where $\lfloor x \rfloor$ represents the nearest integer less than or equal to X.

In this case, the computation of n(k) is simpler but leads to an over-allocation of the bandwidth because of the truncation of N/Si. Although it does not modify the peak cell rate estimated on a time window of length N (dependant of Si), it may increase significantly the instantaneous peak rate seen by the policer and the tolerance could be high.

A third embodiment of Si and Ti without using a floating point computation, and less optimal than the first method, consists in running the placement method twice for the same connection i, with, for each computation, a number of slots Si(k), k=1,2 and an associated period Ti(k), k=1,2 such that:

$$Si=Si(1)+Si(2)$$

with $$Si(1)=\lfloor N/\lceil c/Ri \rceil \rfloor \text{ and period } Ti(1)=\lceil C/Ri \rceil$$

and $$Si(2)=\lceil Ri/C \cdot N \rceil - Si(1) \text{ with period } Ti(2)=\lfloor N/Si(2) \rfloor$$

This placement of the Si(2) has, of course, a significant impact on the CDV tolerance. The only way to avoid this impact with only fixed point operations is to consider the peak cell rate such that N may be divided by Si, i.e., $$Ti=\lfloor N/Si \rfloor = N/Si$$

This assumption would imply not only that there will be no degradation of the CDV tolerance but also that the proposed method would be optimal.

One can note also that the operations to perform this calculation are simple and can be easily implemented in ATM network nodes. A hardware device will provide better performance than a pure software implementation in the ATM high speed adapters where the shaping function is located.

As shown in FIG. 7, a preferred embodiment of the invention is a high speed line adapter 20 of a fixed length cell switching network node 5 supporting the output lines 25 and implementing the shaping function. The fixed length cells (not shown) are sent by a switch 30 of the network node onto a link 198 to a switch interface 200 of the adapter. The fixed length cells contain one header, including an information of Quality of Service (QOS). The switch interface sends the cells through a link 202, stacking the cells in queues 215 in a storage area 210. Each queue corresponds to a different QoS and will be processed according to the corresponding priority. In parallel, a general processor 235, continuously receives, via a link 233, the messages of the connection establishment and fills up two tables with the information read in said messages. In a first table 225, the connection table, the general processor sends into each entry through a link 219 an identifier of the input connection and an identifier of the output connection. In a second table 245, the parameter table, the general processor sends to each table entry via a link 221, the output connection identifier, the period T and the number of entries S to be reserved by the shaping function in the TDM table for said connection. The connection table 225 is used by a router 220 which receives the cells through a link 222 from the queues 215, starting with the queue with the highest priority. The router reads the input connection identifier in the header of the cell and gets via the link 218, the corresponding output connection identifier in the connection table 225. Once found, the router writes through the link 222, the cell in a queue 240 of a storage area 230 and corresponding to said output connection.

In parallel, the placement device 250 reads the parameter table 245 via a link 247. For a given connection identifier, its period T and the number of cells S read in each entry of the parameter table, the device 250 computes the best placement with one of the methods of the invention for the sequence of cells of the connection, represented by the entries reserved in the TDM table 270. Each entry of the TDM table is filled up by the device 250 through a link 268, and contains the connection identifier for which the entry is reserved. When necessary, the device 250 sends a value kT via a link 262 to be computed by the floating point processor 260 which sends back through the same link the integer nearest to kT (k=0, ... S−1). In parallel, a line interface 290 sends onto the output line 25, the cells received via a link 283 and sends a request for a new cell to a scheduler 280 via a link 282. The scheduler when receiving the request for a new cell reads the current entry of the TDM table 270 via a link 271. Thereafter, the scheduler obtains from the storage area 230 via a link 284 the first cell of the queue 240 corresponding to the connection identifier read in the TDM table 270 and sends the cell to the line interface 290 through the link 283.

In summary, the method and apparatus of the present invention prepare in advance the departure of cells on output lines in a fixed length cell switching node in an ATM network. A time division multiplexing table in the apparatus contains entries representing the position of each cell in the output cell stream. At each new ATM connection accepted by the network node, a computation is performed in advance to find the best placement of the cells for the connection in the output cell stream. In one form, the best position corresponds to the minimum cell delay variation between the final spacing of the cells of the connection and the ideal spacing corresponding to the traffic characteristic negotiated at connection establishment time. Different embodiments of the invention correspond to different levels of accuracy for the computation of the best placement for the cells of a new connection in the output cell stream.

While the present invention has been described with respect to several embodiments, the description is illustrative of the invention and is not to be construed as limiting the invention. Various modifications may occur to those skilled in the art without departing from the spirit and scope of the invention.

We claim:

1. For use in a fixed length cell switching node in a telecommunication network supporting transfers of traffic between source units and destination units, each source unit sending traffic to the switching node at a peak cell rate R established at the time of connection of that source unit to the switching node, said node including output queues, means for maintaining a Time Division Multiplexing (TDM) table having N positions, each position containing a pointer to one of the output queues, and means for sequentially selecting the table positions on a regular basis to thereby select the output queue identified by the point in the selected table position, a method for controlling the TDM table contents to shape a cell stream delivered to an output of the switching node to include new traffic provided over a new connection to one of the source nodes, said method comprising the steps of:

determining the number S of positions to be reserved in the TDM table for queue pointers for the new traffic and the period T for the new traffic, the period T being the inverse of the peak cell rate R for the new traffic;

on an iterative basis, fitting new traffic queue pointers into the TDM table by writing tentative queue pointers into free positions in the TDM table with a nominal separation that would cause the new traffic queue to be accessed at the peak cell rate R and determining the actual Cell Delay Variation (CDV) for each possible fit, CDV being the deviation between the actual and ideal positions of new traffic queue pointers in the TDM table;

selecting the possible fit having the smallest CDV value; and writing new traffic queue pointers into the TDM table positions already designated for that fit.

2. The method of claim 1 wherein each iteration of the step of fitting new traffic queue pointers into the TDM table comprises the further steps of:

identifying an initial free position in the TDM table;

identifying ideal table positions located in the TDM table at the initial free position and at each table position at one or more nominal separations from the initial free position;

writing a tentative queue pointer into each free ideal table position or, if the ideal table position is already occupied by a queue pointer, into the closest free table position;

determining the cell delay variation for each iteration as a function of the number of collisions, a collision occurring where an ideal table position is already occupied by a queue pointer, and the cumulative separation between ideal table positions and the closest free table positions into which the tentative queue pointers had to be written.

3. The method of claim 2 wherein the iterative process is ended if, during one such iteration, ideal table positions are found to be free for all needed tentative queue pointers.

4. In a fixed length cell switching node in a telecommunication network supporting transfers of traffic between source units and destination units, each source unit sending traffic to the switching node at a peak cell rate R established at the time of connection of that source unit to the switching node, said node including output queues, means for maintaining a Time Division Multiplexing (TDM) table having N positions, each position containing a pointer to one of the output queues, and means for sequentially selecting the table positions on a regular basis to sequentially selected the output queues identified by the pointer in the selected table positions, means for controlling the TDM table contents to shape a cell stream delivered to an output of the switching node to include new traffic provided over a new connection to one of the source nodes, said means comprising:

processor means for reading the peak cell rate R for the new traffic to determine the number S of positions to be reserved in the TDM table for queue pointers for the new traffic and the period T for the new traffic, the period T being the inverse of the peak cell rate R;

means for tentatively and iteratively fitting new traffic queue pointers into the TDM table by writing tentative queue pointers into free positions in the TDM table with a nominal separation that would cause the new traffic queue to be accessed at the peak cell rate R and determining the actual Cell Delay Variation (CDV) for each possible fit, CDV being the deviation between the actual and ideal positions of new traffic queue pointers in the TDM table;

means for selecting the possible fit having the smallest CDV value; and means for writing new traffic queue pointers into the TDM table positions already designated for that fit.

5. The apparatus of claim 4 wherein the means for tentatively and iteratively fitting new traffic queue pointers into the TDM table further comprises:

means for identifying an initial free position in the TDM table;

means for identifying ideal table positions in the TDM table at the identified free position and at a nominal separation or multiples of the nominal separation from the initial free position;

means for writing a tentative queue pointer into each free ideal table position or, if the ideal table position is already occupied by a queue pointer, into the closest free table position;

means for determining the cell delay variation for each iteration as a function of the number of collisions, a collision occurring where an ideal table position is already occupied by a queue pointer, and the cumulative separation between ideal table positions and the closest free table positions into which the tentative queue pointers had to be written.

6. The apparatus of claim 5 further including means for terminating operation of the fitting means if, during one such iteration, ideal table positions are found to be available for all needed tentative queue pointers.

* * * * *